United States Patent [19]

Leitch

[11] 4,232,189
[45] Nov. 4, 1980

[54] AM STEREO RECEIVERS

[75] Inventor: Clifford D. Leitch, Quincy, Ill.

[73] Assignee: Harris Corporation, Cleveland, Ohio

[21] Appl. No.: 829,518

[22] Filed: Aug. 31, 1977

[51] Int. Cl.³ .............................................. H04R 5/04
[52] U.S. Cl. ................................... 179/1 G; 455/265
[58] Field of Search ............... 325/418, 419, 420, 421,
325/423, 442, 444, 36; 179/15 BT, 1 G, 1 GQ,
1 GB, 1 GJ, 1 GS

[56] References Cited

U.S. PATENT DOCUMENTS

| 3,031,529 | 4/1962 | Colodny | 179/15 BT |
| 3,043,914 | 7/1962 | Collins, Jr. | 179/15 BT |
| 3,059,189 | 10/1962 | Perisig | 179/1 G |
| 3,109,896 | 11/1963 | Boothroyd | 325/36 |
| 3,311,833 | 3/1967 | Lewis | 179/1 G |
| 3,944,749 | 3/1976 | Kahn | 179/1 GS |
| 4,018,994 | 4/1977 | Kahn | 179/1 GS |
| 4,037,165 | 7/1977 | Ogita | 179/15 BT |

Primary Examiner—Benedict V. Safourek
Assistant Examiner—Tommy P. Chin

[57] ABSTRACT

Radio receiver systems for recovering stereo program signals from a composite stereo signal which has been modulated with either quandrature modulation or modified quadrature modulation techniques. In one embodiment, a receiver is provided which directly recovers the program signals from the composite signal by means of product detectors, without first converting the composite signal into an IF signal. In another embodiment an IF stage is provided, but is designed to have broad bandpass characteristics. This embodiment additionally includes a phase locked loop for forcing the IF frequency into the center of the IF passband. In either case, the stereo demodulation is accomplished by product detectors which multiply the composite signal by phase reference signals. Several methods of synthesizing stable phase reference signals are shown.

9 Claims, 6 Drawing Figures

AM STEREO RECEIVERS

BACKGROUND AND FIELD OF THE INVENTION

The present invention relates to the art of radio receiver systems, and more particularly to systems for receiving single channel, amplitude modulated signals representing stereophonic program signals.

The broadcasting community has long sought an acceptable system for transmitting and receiving stereophonic signals in the AM frequency band. Although many systems have been proposed, non has yet met with general acceptance. Several of these schemes have proposed modulating the two program signals onto differently phased carriers which are linearily combined into a single composite stereo signal before being transmitted. Some of the proposed systems have set the phase angle between the two carrier signals to be approximately 90°, thus creating a standard quadrature modulation scheme. Other systems have also been proposed wherein the phase angle between the two carrier signals is modified to be less than 90°. Modified quadrature modulation schemes of this nature are disclosed in the following patents: Collins, Jr., et al., U.S. Pat. No. 3,231,672; Barton, U.S. Pat. No. 3,102,167; and in my co-pending patent application, Ser. No. 812,657, filed on July 5, 1977.

To receive a signal modulated in this fashion, synchronous detection schemes must be employed, such as described in the patent to Collins, Jr., U.S. Pat. No. 3,043,914 and the patent to Colodny, U.S. Pat. No. 3,013,529. In order to provide optimum reception, it is necessary that a carrier signal be provided which is synchronized with the incoming carrier in both phase and frequency. This synchronism must be quite exact in order to obtain maximum separation between the recovered stereo signals. Although this constraint can be relaxed to some extent if a standard quadrature modulation scheme is employed, this approach is not desirable since it has been found that compatibility with existing monophonic AM receivers requires that this phase angle be considerably smaller. As the phase angle is reduced from 90° to much smaller angles, however, the exactness and stability of the synchronous detection becomes even more critical.

Moreover, conventional AM detection schemes have employed intermediate-frequency (IF) stages having very narrow bandpass characteristics in order to improve the selectivity of the AM receiver. When these techniques are utilized in detecting the modulated signals referred to previously, however, the bandpass of the IF stage must be symmetrical on either side of the composite stereo signal which is being demodulated or else further degradations in stereo separation will result.

SUMMARY OF THE INVENTION

There are described herein receiver circuits which may be used for recovering the stereo program signals from a composite stereo signal which has been modulated with either quadrature modulation, or modified quadrature modulation techniques. These circuits are relatively simple and inexpensive, and yet provide good stereo separation in demodulation of composite signals having even very small phase angles between the two stereophonic components thereof.

In accordance with one aspect of the present invention, stereo receivers are provided which do not include IF stages but which rather recover the program signals from the incoming RF signals directly through use of product detectors.

In accordance with another aspect of the present invention, other receivers are provided which do include IF stages, but which IF stages have broad bandpass characteristics. These receivers include phase lock loops which force the frequency of the IF signal into the center of the bandpass of the IF stage so that the sidebands on either side of the carrier are symmetrically affecting by the IF stage, thereby producing minimal degradation of stereo separation.

In accordance with yet another aspect of the present invention, a highly stable oscillator having a fixed frequency of oscillation is utilized as a frequency reference in the phase lock loop so as to fix the frequency of oscillation of the local oscillator at some multiple of the fixed frequency. Since the oscillator which provides the fixed frequency is highly stable, the operation of the local oscillator will be stabilized thereby.

BRIEF DESCRIPTION OF THE DRAWINGS

The foregoing and other objects and advantages of the present invention will become more readily apparent from the following description of a preferred embodiment, as taken in conjunction with the accompanying drawings which are a part hereof, and wherein.

DETAILED DESCRIPTION OF THE DRAWINGS

In order to promote a clearer understanding of the demodulation which must be provided by the radio receivers described herein, a more detailed description will now be provided of the nature of the modulated signals.

The composite modulated signal which is to be received by the receivers set forth herein may be described by the mathematical expression:

$$X(t) = \cos \omega_c t + L(t) \cos (\omega_c t - \theta) + R(t) \cos (\omega_c t + \theta) \quad (1)$$

where
$X(t)$ is the composite stereo signal;
$\omega_c$ is the carrier frequency in radians/sec.;
t is the time in seconds;
$\theta$ is a phase angle in radians; and,
$L(t)$ and $R(t)$ are the program signals, with
$L(t) = L =$ left channel modulating signal and
$R(t) = R =$ right channel modulating signal.

Figure 1A:
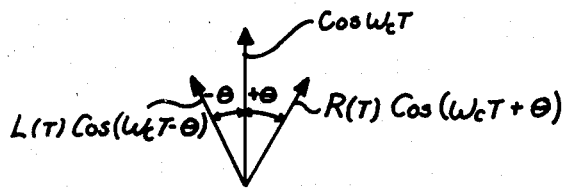
FIGS. 1(a) and (b) are vector diagrams useful in understanding the nature of the composite modulated signal.

It will be seen from this description that the transmitted signal may be viewed as comprising three vector components: a carrier component, and two modulated components which are phased at equal angles $\theta$ on either side of the carrier signal. This is illustrated by the vector diagram of FIG. 1(a). For conventional quadrature modulation, the phase angle $\theta$ will be equal to 45° so that the left and right vector components are phased apart by a total phase angle of 90°. For modified quadrature modulation schemes, this phase angle will be less than 45°.

Figure 1B:
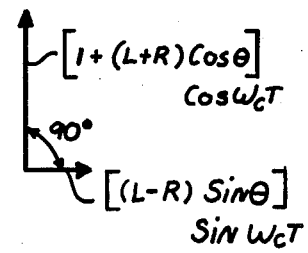

The transmitter signal may equivalently be represented by the mathematical expression:

$$X(t)=[1+(L+R)\cos\theta]\cos\omega_c t+[(L-R)\sin\theta]\sin\omega_c t \qquad (2)$$

where the symbols are as defined above. This expression defines the transmitted signal in terms of two vector components which are in-phase ($\cos\omega_c t$) and out-of-phase ($\sin\omega_c t$) with the carrier component. This representation is illustrated in the vector diagram of FIG. 1(b).

Equations (1) and (2) both describe the same modulated signal. They bring out, however, that the modulated signal may equivalently be defined in two different ways. This is brought out in greater detail in my co-pending application which was referred to previously. These equations moreover identify two different methods whereby the program signals may be recovered from the composite modulated signal. These two methods will be described hereinafter with reference to the preferred embodiments.

Figure 2:
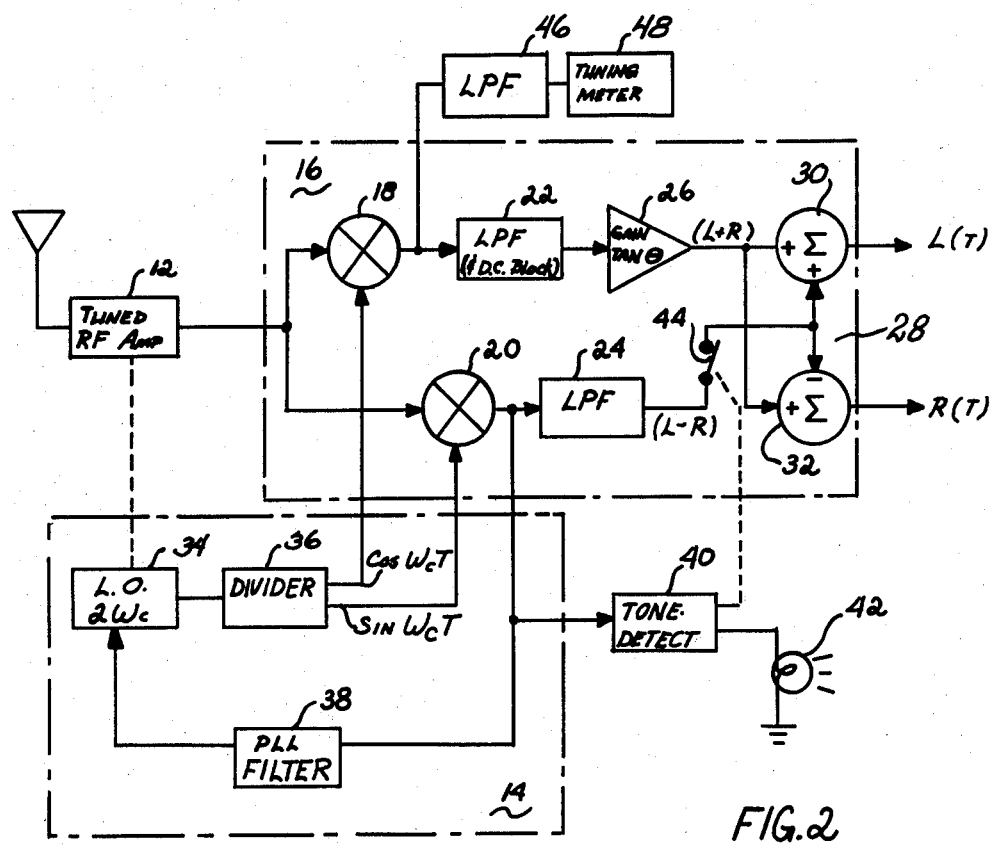
FIG. 2 is an illustration of one embodiment of a direct conversion radio receiver in accordance with the present invention.

There is shown in FIG. 2 a preferred embodiment of a direct conversion synchronous receiver in accordance with the present invention. This receiver includes a front-end 10 comprised of a tuned RF amplifier 12, a carrier recovery circuit 14, and a stereo demodulator circuit 16.

Stereo demodulator 16 includes two product detectors 18 and 20. These product detectors will be of conventional construction and operation and may, for example, each comprise a Motorola integrated circuit identified by the designation MC 1496. Each product detector responds to two input signals and provides an output signal corresponding to the product of the input signals. For convenience of description, these inputs will be referred to hereinafter as having a signal input and a phase reference input. The product detectors will detect those vector components of the input signal which are in-phase with the phase reference signal. The detector will not detect components which are in phase-quadrature with the phase reference signal.

Product detector 18 multiplies the incoming RF signal with a phase reference signal which is in phase synchronism with the carrier component ($\cos\omega_c t$) of the modulated signal, while product detector 20 multiplies the composite modulated signal with a phase reference signal which is in phase-quadrature with the carrier signal ($\sin\omega_c t$). Product detectors 18 and 20 will therefore respectively recover the in-phase and quad-phase components of the modulated signal. Referring back to Equation (2), it will be seen that the in-phase component includes information corresponding to the sum of the two program signals (L+R), while the quad-phase component contains information relating to the difference of the two program signals (L−R). In addition, various higher frequency, spurious components will be generated by the product detectors which must be removed. Low-pass filters 22 and 24 are thus provided to remove all components above the audio band. Low-pass filter 22 will additionally serve to block the DC component which is present in the in-phase channel due to the presence of the carrier signal.

The output of low-pass filters 22 and 24 may thus be defined as $[(L+R)\cos\theta]$ and $[(L-R)\sin\theta]$, respectively, where the weighting factors $\sin\theta$ and $\cos\theta$ will vary with the phase angle $\theta$ by which the program modulated signals are displaced in phase from the carrier. If a quadrature modulation scheme is being used, these two weighting terms will be equal, and may be ignored. If a modified quadrature modulation scheme is being employed, however, such that the angle between the two modulated components is less than 90°, these terms will not be equal. The relative magnitudes of the in-phase and quad-phase components must thus be equalized in some manner. A gain circuit 26 is provided for this purpose. Gain circuit 26 adjusts the gain of the in-phase channel by a factor which is proportional to the tangent of the phase angle $\theta$, thereby equalizing the magnitude of the in-phase and quad-phase components. These two components, corresponding to the sum and difference of the two stereophonically related signals, will then be supplied to a conventional audio matrix 28 comprised of signal adders 30 and 32 so as to recover therefrom the left and right stereo component signals.

Conventional monophonic AM receivers often include envelope detectors for recovering the audio information, rather then product detectors as employed in stereo demodulator 16. These envelope detectors function to recover the entire envelope from the incoming signal and are incapable of distinguishing between amplitude modulation functions which are provided by different frequency carriers. Consequently, it has been the practice to utilize superheterodyne receivers which include an intermediate stage which can be tuned to a very narrow bandpass and thereby improve the selectivity of the receiver. Were a narrow range IF stage included in the receiver of FIG. 2, however, degradation in stereo separation would result unless the bandpass of the IF stage were exactly symmetrical about the carrier frequency.

Moreover, an IF stage is unnecessary in the present application. Product detectors inherently have a high degree of selectivity since they only detect those signals which are in-phase with the phase reference signal. Since product detectors 18 and 20 are included rather then envelope detectors, any desired degree of selectivity can be obtained by varying the cut-off frequency of low-pass filters 22 and 24. Therefore, the embodiment of FIG. 2 does not include an IF stage, but rather serves to directly convert the composite RF signal into its various components by means of product detectors 18 and 20.

In order to accomplish the demodulation function required of stereo demodulator 16, it is necessary to recover phase reference signals which are very closely related in phase and frequency to the carrier of the modulated signal. This is the function of carrier recovery circuit 14. Carrier recovery circuit 14 includes a local oscillator 34 which is operated at twice the carrier frequency of the signal to be demodulated. The RF signal provided by local oscillator 34 is divided down by means of a divider circuit 36 into two quadrature-phased signals which each oscillate at half the frequency of the local oscillator. Local oscillator 34 may comprise a square wave RF signal generator, while divider 36 could comprise a digital divider of well-known construction.

The frequency of oscillation of local oscillator 34 is coarsely established by a manually controlled adjustment, which adjustment also serves to select the tuned frequency of RF amplifier 12. Local oscillator 34 is fine tuned to match the frequency of the closest signal appearing at the output of tuned RF amplifier 12 by means of a feedback loop comprised of product detector 20 and a phase locked loop filter 38. It will be recognized that product detector 20 functions essentially as a phase detector for determining when the two signals which are input thereto are in phase-quadrature; the DC level of the output will vary as the sine of the phase error between the two input signals, (i.e., the amount by which the two signals are out of phase-quadrature) and will only be zero when no phase error exists. The output of the product detector 20 is supplied to phase locked loop filter 38 which separates out all audio and higher frequency component, leaving only the low frequency variations which are due to non-synchronism between the incoming signal and the frequency of oscillation of the local oscillator. These signals are fed back to the frequency control input of local oscillator 34, and operate to synchronize and stabilize the operation thereof at the frequency of the nearest incoming signal.

This receiver additionally includes several refinements. One refinement is provided to automatically switch the receiver between stereo and mono modes of operation. This function will be implemented by detecting the presence or absence of a stereo indicator signal which will preferably be included in those modulated signals which include stereo information. This indicator signal may, for example, be a low frequency (e.g., 24 Hz) signal included in the quad-phase channel at a low level of modulation. Detection may be easily accomplished by including a tone detector 40 which receives its input from product detector 20.

Tone detector 40 will control two elements; a stereo indicator lamp 42 and a stereo disable switch 44. When the stereo indicator tone is detected, lamp 42 will be lighted and switch 44 will be closed. This closure of switch 42 will result in the normal stereo operation. If the tone is not present, however, then tone detector 40 will cause switch 44 to open, thus preventing the difference signal from reaching audio matrix 28. Since no quad-phase component will exist for mono signals, it is desirable that the difference channel (which could only contain noise) should be disabled in this manner. Alternately, switch 44 could be manually controllable.

Figure 3:
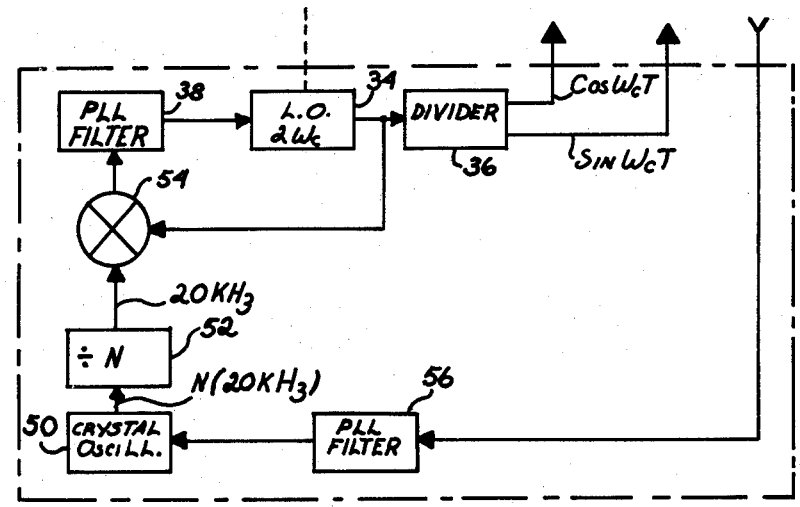
FIG. 3 is an illustration of a second embodiment of the carrier recovery portion of the direct conversion radio receiver of FIG. 2.

A second refinement shown in the embodiment of FIG. 3 is included to provide the listener with an indication of the strength of the received signal. As stated previously, the output of product detector 18 will include a DC term which is due to the presence of the carrier signal and the fact that the phase reference signal is in-phase with the carrier. The amplitude of this DC signal is directly related to the carrier amplitude, and may thus be directly used to provide an indication of signal strength. A low-pass filter 46 filters this signal and provides it to a tuning meter 48. If desired, the signal supplied at the output of low-pass filter 46 may also be used to control the operation of a squelch circuit (not shown). The stereo outputs would then be muted unless the incoming signal were stronger than a certain level.

FIG. 3 illustrates a second embodiment of carrier recovery circuit 14 which is devised to provide greater stability in the recovered carrier signals. As previously, a local oscillator 34, divider 36, and phase locked loop filter will be included. In addition, a crystal oscillator 50 is provided having a very stable, substantially fixed output frequency. This output frequency is a high multiple of 20 kHz, and is divided down by a divider circuit 32 to provide a 20 kHz signal at the output thereof. This 20 kHz signal is directed to a phase detector 54 along with the output of local oscillator 34 so that local oscillator 34 is constrained to oscillate at multiples of 20 kHz. When local oscillator 34 is manually adjusted by the operator, the phase locked loop comprised of phase detector 54 and phase locked loop filter 38 will adjust the operation thereof so that the local oscillator 34 will lock in at the closest multiple of 20 kHz. Although the local oscillator 34 will thus move in 20 kHz increments, the phase reference signals which are eventually supplied to stereo demodulator 16 will move in 10 kHz increments because of the division provided by divider 36. A separation of 10 kHz between adjacent frequencies has been selected since this corresponds to the separation between allocated channel frequencies in the AM frequency band.

In order to fine tune the operation of this frequency recovery circuit, crystal oscillator 50 will be provided with means for varying the oscillation frequency thereof by very small amounts. This could be accomplished, for example, by providing a varactor in parallel with the crystal, and by varying the DC bias voltage across the varactor. A frequency control input will control the bias level and will be supplied with a control signal by phase locked loop filter 56. This filter receives an input from the output of product detector 20, as before. This second phase locked loop, comprised essentially of product detector 20 and phase locked loop filter 56, serves to fine tune the frequency of oscillation of crystal oscillator 50 so as to correspondingly vary the frequency of oscillator 34. This will force the phase reference signals supplied to product detectors 18 and 20 into close synchronism with the in-phase and quad-phase components of the modulated signals. Since the operation of crystal oscillator 50 is extremely stable, the operation of local oscillator 34 is stabilized to a similar degree thereby.

Figure 4:
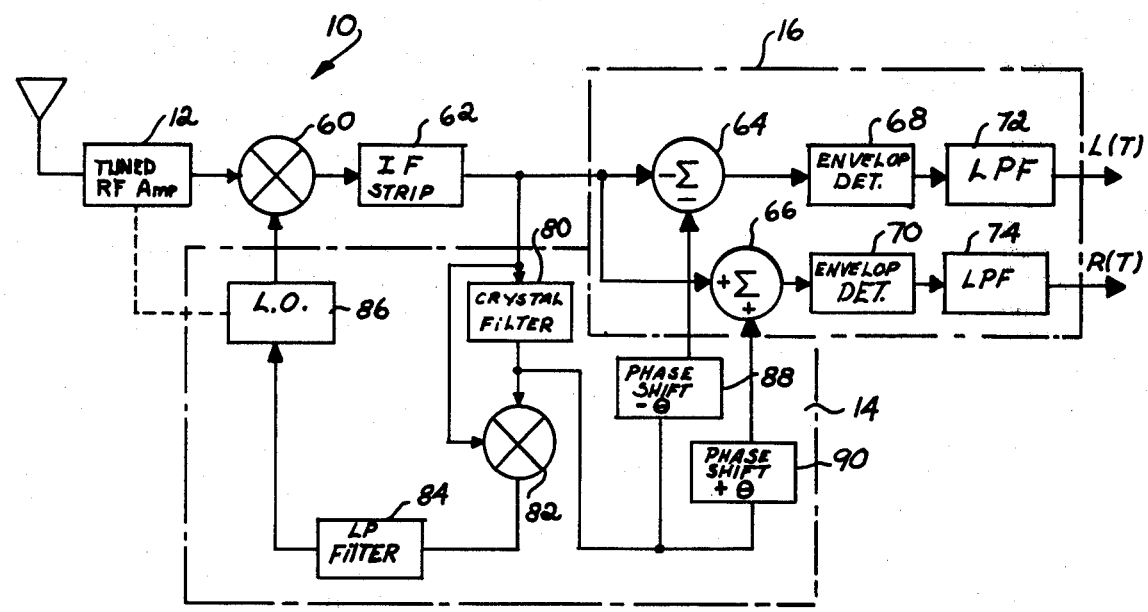
FIG. 4 is an illustration of one embodiment of a superheterodyne radio receiver utilizing a crystal filter for selecting the IF frequency; and, FIG. 5 is an illustration of a second embodiment of a superheterodyne radio receiver in accordance with the present invention.

In the event that an IF stage is to be included in the receiver, an embodiment such as shown in FIG. 4 may be provided. In this embodiment, the front-end 10 includes a tuned RF amplifier 12, as previously. In addition, an IF mixer 60 is included for combining the incoming RF signal with the signal provided by the local oscillator, to provide an IF signal at the output thereof. This IF signal is directed to an IF strip 62.

As stated previously, in order to prevent degradation of stereo separation it is necessary that the bandpass characteristics of IF strip 62 be symmetrical on either side of the IF frequency. In order to minimize loss of separation due to the IF frequency not falling exactly within the center of the passband of strip 62, it is preferable that IF strip 62 have as flat a frequency characteristic as possible within the frequency band of the IF signal. Preferably, IF strip 62 will have a broad bandpass characteristic so as to insure that the characteristic will be substantially flat within the area of interest. In the prior art, of course, it was preferable that the bandpass characteristic of the IF strip be as narrow as possible in order to improve the selectivity of the envelope detectors which characteristically followed the strip.

The IF signal (at the output of IF strip 62) will have a form quite similar to the composite modulated signal and may be defined by the mathematical expressions:

$$S(t) = \cos \omega_I t + L(t) \cos (\omega_I t + \theta) + R(t) \sin (\omega_I t - \theta) \quad (3)$$

and:

$$S(t) = [1 + (L+R) \cos \theta] \cos \omega_I t - [(L-R) \sin \theta] \sin \omega_I t \quad (4)$$

where
S(t) is the entire IF signal,
$\omega_I$ is the IF carrier signal (and is equal to $\omega_o - \omega_c$, where $\omega_o$ is the frequency of the local oscillator), and all other symbols are as defined previously.

It will be noted that Equations (3) and (4) are quite similar to Equations (1) and (2) with the exception that the carrier frequency has been shifted to the IF frequency, and various signs have been changed.

In the embodiment of FIG. 4, a stereo demodulator 16 is provided which recovers the two program signals from the IF directly, rather than as sum and difference signals. This could be done by utilizing product detectors which are supplied with appropriate phase reference signals. If a modified quadrature modulation scheme is employed, the phase angle between the vector components corresponding to the two program signals will be less than 90°. Because of this, each component will include a portion which is in-phase with the other component. In order to prevent incidental demodulation of parts of both vector components when demodulation of only a single component is desired, the reference signal which is supplied to the product detector must be in phase-quadrature with one of the components.

Product detectors, as such, are not used in the embodiment of FIG. 4, however. In place of product detectors, each of the demodulating channels in this embodiment includes a signal summer and an envelope detector. Envelope detectors, however, perform essentially as product detectors when the percent modulation of the carrier signal is quite low; that is, the output of the envelope detector will correspond substantially to the portion of the modulating function which is in-phase with the carrier signal and will not include the components which are in phase-quadrature with the carrier. To demodulate the IF, then, the embodiment of FIG. 4 adds to the IF signal an RF signal having a much greater amplitude than the signal input and which is in phase-quadrature with one of the two vector components. By directing the resulting signal through an envelope detector, the other vector component may be detected. Thus, each channel includes a signal summer 64 and 66 for adding high amplitude phase reference signals to the IF, and envelope detectors 68 and 70 for detecting the components corresponding to the two program signals. To prevent the recovered left and right channels from being out-of-phase with one another, it is necessary to make signal summer 64 a signal subtractor, rather than an adder. These two program signals, as detected by envelope detectors 68 and 70, are directed through low-pass filters 72 and 74, which removes various spurious frequency components therefrom.

In order for the embodiment of FIG. 4 to operate effectively, the carrier recovery circuit 14 must recover two RF signals which are each in phase-quadrature with one of the two vector component signals. To accomplish this function, a crystal filter 80 is provided. The local oscillator is locked into a phase locked loop with a crystal filter in such a manner that the IF signal will fall directly within the center of the very narrow bandpass characteristic of crystal filter 80. A product detector 82 is provided for determining when the IF signal is at the proper frequency and phase. Thus, crystal filter 80 will provide a 90° phase shift of the incoming signal only when the frequency of the incoming signal corresponds exactly to the center frequency thereof. Consequently, by directing the input and output of crystal filter 80 into product detector 82, an error signal will be provided indicating the amount of deviation of the IF signal from the desired frequency. The output of product detector 82 will be directed through phase locked loop filter 84 and thence through local oscillator 86. In this fashion, the frequency of oscillation of local oscillator 86 will be adjusted in such a manner that the IF frequency will correspond exactly to the center frequency of crystal filter 80.

IF strip 62 will be tuned so that the center of the bandpass characteristics thereof will correspond to the center frequency of crystal filter 80. Consequently, the inclusion of this phase locked loop will force the IF signal to the center of the bandpass of IF strip 62, thereby improving stereo separation.

Since the output of crystal filter 80 is in phase-quadrature with the IF carrier signal, the two reference signals which are to be used in demodulating the two vector components can be synthesized merely by phase shifting the output of crystal filter 80 through two phase shift circuits 88 and 90. Since the reference signal supplied at the output of phase shift circuit 88 is in phase-quadrature with the right vector component, the demodulation network to which this reference signal is directed will serve to demodulate the left vector component. On the other hand, since the output of phase shift circuit 90 is in phase-quadrature with the left vector component, the demodulation circuit to which this reference signal is directed will serve to demodulate the right vector component.

Figure 5:
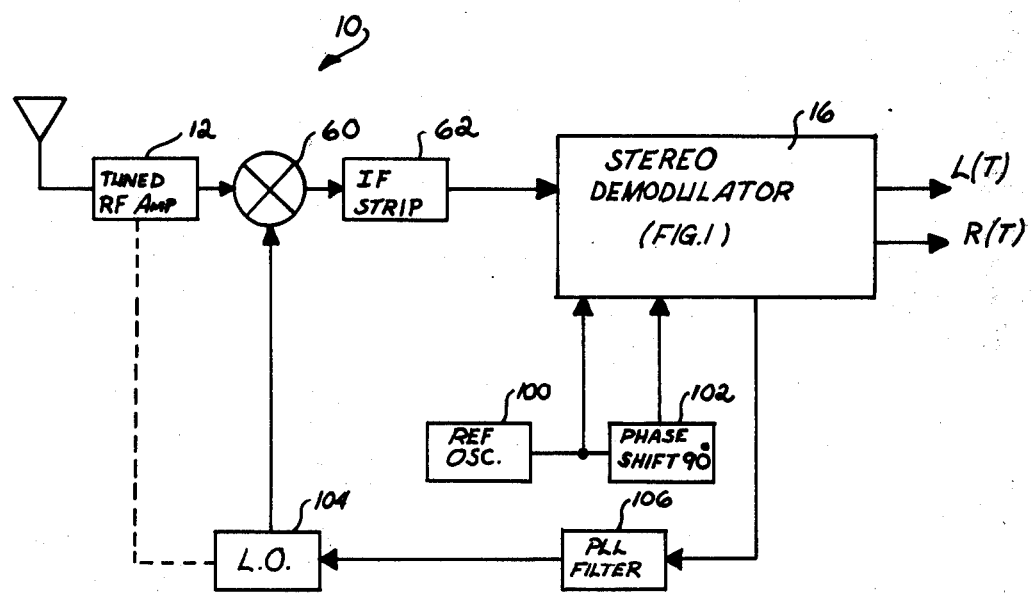

FIG. 5 illustrates yet another embodiment of the present invention, again employing an IF stage. This embodiment employs the front-end 10 which is substantially identical to the front-end of the embodiment of FIG. 4. A tuned RF amplifier 12, mixer 60, and IF strip 62 are thus included. The output of the IF strip 62, however, will be directed to a stereo demodulator circuit 16 having substantially the form shown in FIG. 1. Thus, this stereo demodulator circuit will serve to recover the left and right vector components of the composite stereo signal through use of product detectors which are driven by reference signals which are in phase synchronism and in phase-quadrature with the IF signal. A reference oscillator 100 and phase shifter circuit 102 are included to provide these reference signals. The local oscillator 104 is phase-locked in such a manner that the IF frequency will exactly match, in phase and frequency, the signal provided by reference oscillator 100. Phase-locking is accomplished by taking the output of the quad-phase product detector (identified by reference number 20 in FIG. 1), directing it through a phase locked loop filter 106 and into the frequency control input of local oscillator 104. The IF strip 62 will again be tuned so that the frequency of oscillation of reference oscillator 100 lies directly within the passband thereof, so that the operation of the phase locked loop will serve to force the IF frequency to the center of the passband of IF strip 62.

The receivers which have been described serve to demodulate composite stereo signals which have been modulated in accordance with either pure or modified quadrature modulation techniques. Several approaches have been identified. In one, the stereo channels are derived by direct conversion of the composite signal through use of product detectors. The selectivity of the receiver is still quite high because product detectors are used. Furthermore, since IF stages are not used in this approach, the problem of degradation of stereo separation due to their inclusion is avoided. The second approach does include an IF stage, but avoids problems of stereo separation degradation by providing the IF stage with a broad bandpass characteristic and by using a phase locked loop to force the IF signal into the center of the IF bandpass.

The techniques identified in FIGS. 2-5 may be rearranged in innumerable ways. For example, either of the stereo demodulators (of FIGS. 2 and 4) may be used in any of the embodiments. It will be noted, however, that each demodulation stage includes product detectors for synchronously demodulating the modulated signal. (As has been stated previously, the envelope detectors and signal summers of FIG. 4 operate essentially as product detectors). Also, of course, the refinements described with reference to FIG. 2 may be readily applied to the other receivers. Additionally, the gain of the in-phase and quad-phase channels in the embodiment of FIG. 2 may be corrected in other manners, as by providing a gain factor of $[-\cot\theta]$ in the quad-phase channel instead of the $[\tan\theta]$ factor in the in-phase channel. Moreover, the phase locked loop techniques described may be utilized with minimum alteration in most of the embodiments. There will be no attempt to exhaustively list the many variations which are possible; clearly innumerable combinations of the described receivers are possible.

Therefore, although the invention has been described with respect to a preferred embodiment, it will be appreciated that various rearrangements and alterations of parts may be made without departing from the spirit and scope of the present invention, as defined in the appended claims.

What is claimed is:

1. A radio receiver for receiving and directly demodulating a composite stereo signal including two program signals which have been modulated onto a carrier signal in accordance with pure or modified quadrature modulation techniques comprising:
   means for receiving said composite stereo signal and for directly supplying said signal to a stereo demodulator without converting said signal to an intermediate frequency;
   stereo demodulator means responsive to said composite stereo signal for demodulating said signal to recover said program signals and including first and second detector means, each responsive to said composite stereo signal and to a corresponding phase reference signal for respectively demodulating in-phase and quadrature-phase components of said composite stereo signal, and signal processing means responsive to the demodulated in-phase and quadrature-phase components provided by said first and second detector means for processing said signals to recover said program signals therefrom; and
   means for providing said phase reference signals and for synchronizing said signals in frequency with said composite stereo signal, with the phases of said reference signals being selected so that said in-phase and quadrature-phase components of said composite stereo signal are demodulated by said detector means, said reference signal providing means including oscillator means for providing said phase reference signals and responsive to a control signal for varying the frequency of said phase reference signals, and means for filtering the demodulated quadrature-phase component so as to derive a control signal, said control signal being provided to said oscillator means for controlling the frequency of oscillation thereof,
   whereby said program signals are recovered without use of an intermediate frequency stage so that degradation of stereo separation due to the presence of an intermediate frequency stage is avoided.

2. A radio receiver as set forth in claim 1, wherein said first and second detectors are respectively supplied by said phase reference signal providing means with phase reference signals which are in phase synchronism with, and in phase quadrature with said carrier signal whereby said respective components which are demodulated thereby comprise an in-phase component and a quad-phase component.

3. A radio receiver as set forth in claim 1, wherein said oscillator means includes a reference oscillator for providing a first reference signal, means for adjusting the frequency of operation of said reference oscillator in accordance with said control signal, and means for deriving said phase reference signals from said first reference signal.

4. A radio receiver as set forth in claim 3, wherein said means for adjusting said frequency of operation of said reference oscillator includes crystal oscillator means for providing a highly stable second reference signal, and means for synchronizing said first reference signal at a selected multiple of said second reference signal.

5. A radio receiver as set forth in claim 1, wherein said detector means each comprise signal summer means for combining said composite signal with a corresponding phase reference signal of much greater amplitude, and envelope detector means for recovering the envelope of the sum signal produced thereby.

6. A radio receiver for receiving and demodulating a composite stereo signal including two program signals which have been modulated onto a carrier signal in accordance with pure or modified quadrature modulation techniques comprising:
   means for receiving said composite stereo signal, and for converting said signal to an IF signal and responsive to a frequency control input to adjust said IF frequency;
   IF filter means for filtering said IF signal to provide a filtered IF signal, said filtering means having a broad enough bandpass characteristic that said characteristic is substantially flat over the frequency range of said IF signal;
   means responsive to said filtered IF signal for providing a frequency control signal which is supplied to said frequency control input for forcing said IF frequency into the center of said bandpass of said filter means;
   stereo demodulator means responsive to said filtered IF signal for demodulating said signal to recover said program signals, and including first and second synchronous detector means, each responsive to said filtered IF signal and to a corresponding phase reference signal for demodulating a respective component of said composite stereo signal, and signal processing means responsive to said respective components provided by said first and second synchronous detector means for processing said signals to recover said program signals therefrom; and, means for providing said phase reference signals and for synchronizing said signals in frequency with said filtered IF signal, with the phases of said reference signals being selected so that selected components of said composite stereo signal are demodulated by said synchronous detectors.

7. A radio receiver as set forth in claim 6, wherein said synchronous detectors each comprise signal summer means for combining said composite signal with a corresponding phase reference signal of much greater amplitude, and envelope detector means for recovering the envelope of the sum signal produced thereby.

8. A radio receiver as set forth in claim 6, wherein said phase reference providing means includes means for providing a first reference signal and means for deriving said phase reference signals from said first reference signal.

9. A radio receiver as set forth in claim 8, wherein said means for providing said first reference signal comprises filter means for deriving the IF carrier signal from said IF signal by filtering, said IF carrier signal serving as said first reference signal.

* * * * *